United States Patent
Menelly

(10) Patent No.: US 6,238,216 B1
(45) Date of Patent: May 29, 2001

(54) PLANETARY TEACHING AGE

(76) Inventor: Daniel J. Menelly, Apt. 1712,/320 E42nd St., New York, NY (US) 10017-5966

( * ) Notice: Subject to any disclaimer, the term of this patent is extended or adjusted under 35 U.S.C. 154(b) by 0 days.

(21) Appl. No.: 09/306,959

(22) Filed: May 7, 1999

(51) Int. Cl.$^7$ .................................. G09B 27/00
(52) U.S. Cl. ...................... 434/284; 484/134; 484/290
(58) Field of Search .................. 473/570; 434/134, 434/131, 137, 138, 136, 135, 133, 284, 287, 288, 290, 291

(56) References Cited

U.S. PATENT DOCUMENTS

| | | | |
|---|---|---|---|
| 581,678 | * 4/1897 | Nesbit | 446/139 |
| 2,219,074 | * 10/1940 | Guillou | 473/570 |
| 2,226,032 | * 12/1940 | Wahlberg | 434/291 |
| 2,277,057 | * 3/1942 | Bach | 473/570 |
| 2,418,718 | * 4/1947 | Maginley | 434/291 |
| 2,731,266 | * 1/1956 | Neilson | 473/570 |
| 3,035,356 | * 5/1962 | Musser | 434/291 |
| 3,089,259 | * 5/1963 | Miller | 434/291 |
| 3,102,362 | * 9/1963 | Neal | 473/570 |
| 3,242,595 | * 3/1966 | Eastman | 434/291 |
| 3,287,832 | * 11/1966 | Baerg | 434/291 |
| 3,406,972 | * 10/1968 | Wong | 273/118 A |
| 3,617,063 | * 11/1971 | Dyer | 434/291 |
| 3,733,720 | * 5/1973 | Byers | 434/291 |
| 4,034,488 | * 7/1977 | Trujillo | 434/291 |
| 4,099,339 | * 7/1978 | Snelson | 434/281 |
| 4,137,665 | * 2/1979 | Bierwiler | 446/83 |
| 4,219,944 | * 9/1980 | Keenan | 434/106 |
| 4,271,604 | * 6/1981 | Rowsey | 434/289 |
| 4,299,387 | * 11/1981 | Nishiyama | 273/119 A |
| 4,392,831 | * 7/1983 | Schubert | 434/291 |
| 4,400,162 | * 8/1983 | Rustemis | 434/291 |
| 4,710,979 | * 12/1987 | Bull | 2/48 |
| 4,713,011 | * 12/1987 | Alnafissa | 434/292 |
| 4,931,019 | * 6/1990 | Park | 434/409 |
| 5,033,965 | * 7/1991 | Chiu | 434/131 |
| 5,217,763 | * 6/1993 | Boury | 428/11 |
| 5,347,253 | * 9/1994 | Ogikubo | 335/302 |
| 5,551,688 | * 9/1996 | Miller | 473/570 |
| 5,820,385 | * 10/1998 | Ohashi | 434/409 |

* cited by examiner

*Primary Examiner*—Jacob K. Ackun
*Assistant Examiner*—Ket Fernstrom

(57) ABSTRACT

A science teaching aid in the form of a blue-coated thin metal plate depicting the sky is removably attached to a classroom wall or ceiling. The center of the plate defines a yellow circle depicting the sun. Attached to the plate in various positions around the perimeter of the sun are a number of magnet balls of different colors. Each color indicating one of the nine planets.

7 Claims, 1 Drawing Sheet

PLANETARY TEACHING AGE

BACKGROUND OF THE INVENTION

Three dimensional teaching apparatus for demonstrating the rotational position of the planets with respect to the sun is described in U.S. Pat. No. 4,271,604 entitled portable planetarium. Removable adhesive symbols are used to teach the location of the stars and the path of the sun and planets during the course of the year.

Recently issued U.S. Pat. No. 5,810,602 entitled "Gravity Teaching Aid" describes a tennis ball, or the like, that includes a powerful magnet therein. The so-called "alien magnet ball" readily attaches to a metal surface in apparent defiance of the laws of gravity.

It has recently been determined that such alien magnet balls can further be employed to teach the concept of planet rotation relative to a planar representation of the sun on a metal support plate whereby the balls can be moved in a plane relative to the sun without having to completely remove the balls from the support plate.

One purpose of the instant invention is to describe an educational kit that will demonstrate the position of the planets relative to the sun on a weekly basis, in real time, by allowing movement of the planet representations relative to the sun representation in accordance with actual meteorological conditions.

SUMMARY OF THE INVENTION

A science teaching aid in the form of a blue-coated thin metal plate depicting the sky attached to a classroom wall or ceiling. The center of the plate defines a yellow circle depicting the sun. Attached to the plate in various positions around the perimeter of the sun are a number of magnet balls of different colors. Each color indicating one of the seven planets. The planets are moved around the perimeter of the yellow circle in proportion to actual meteorological conditions.

DESCRIPTION OF THE PREFERRED EMBODIMENT

Figure 1:
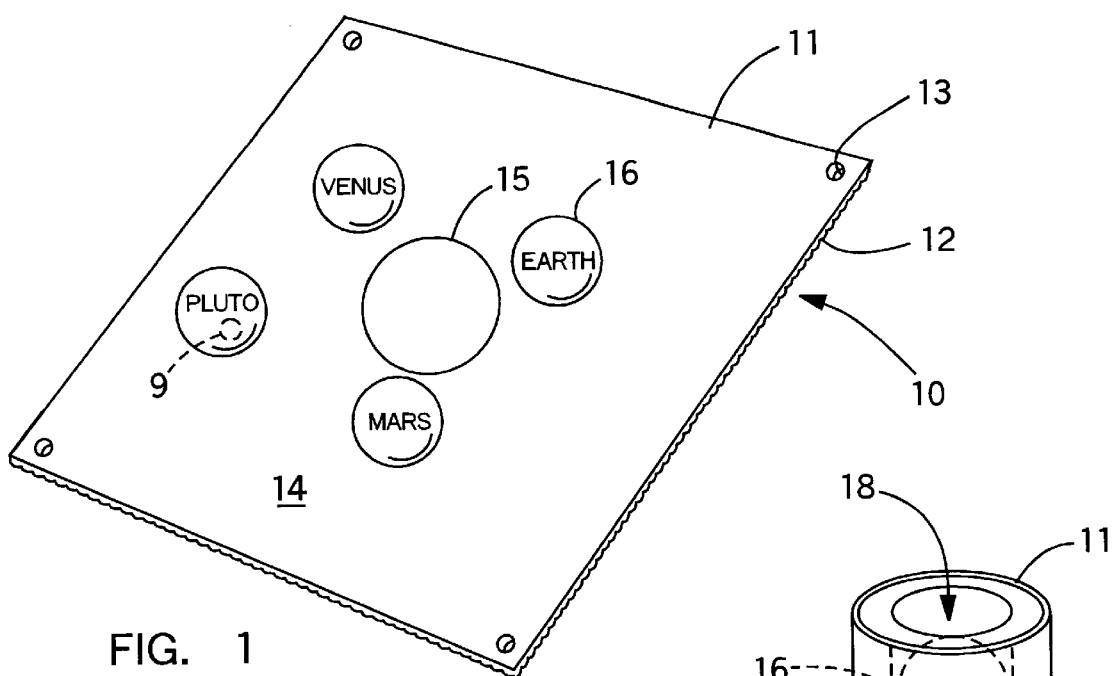
FIG. 1 is a top perspective view of the planet map teaching aid according to the invention.

The teaching aid so-called "planet map" 10 is shown in FIG. 1 to comprise a thin ferrous metal plate 11, herein after "sky plate", having Velcro strips, as indicated at 12 on a rear surface thereof to assist in the removable attachment of the plate to a classroom wall or ceiling. Alternatively, apertures 13 can be formed on the opposing corners for screwing the plate to the wall or ceiling, if preferred. The surface 14 of the plate 11 is coated with a blue paint to depict the sky, and a circle 15 of yellow paint is applied to the center of the plate to depict the sun.

In accordance with the invention, a plurality of felt, plastic or rubber magnet balls 16 each of a different color in accordance with a selected one of the planets, and each containing an internal magnet 9, is positioned on the sky plate 11 around the circle 15 in accordance with the meteorological position of the planets at the time of the attachment. The magnet balls are formed of a magnet ball diameter in the manner described within the aforementioned U.S. Pat. No. 5,810,602. A beneficial feature of the invention is the ability to move the magnet balls 16 in relation to the position of the representative planets in real time on a weekly basis without having to disengage the magnet balls from the sky plate 11.

Figure 2:
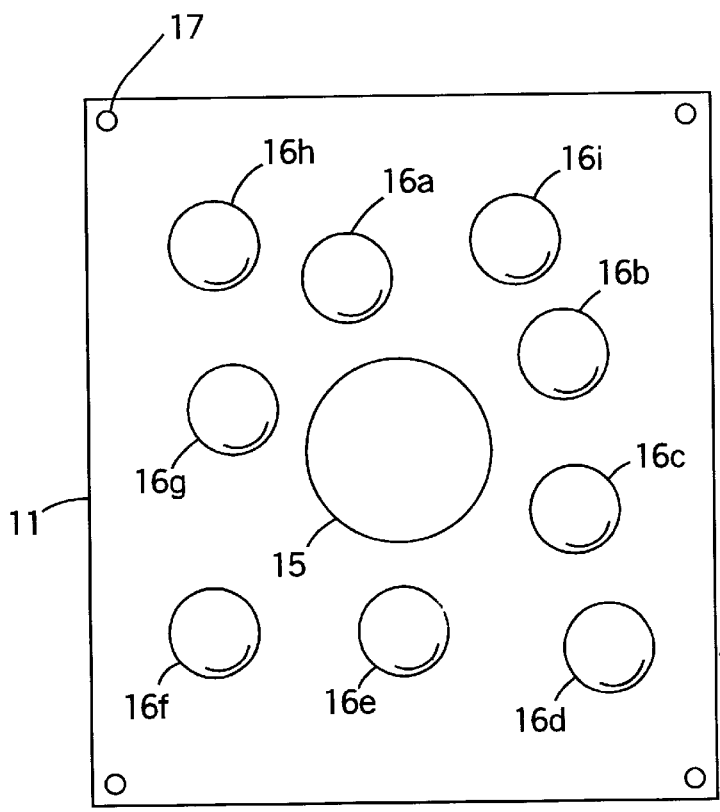
FIG. 2 is a top plan of the planet map of FIG. 1.

As best seen by now referring to FIG. 2, the planet map 10 is shown attached to a classroom ceiling or wall, not shown, by means of screws, as indicated at 17. Each of the nine planets are represented by individual magnet balls 16a–16i, which may be colored, as described earlier, in accordance with the colors usually associated with each specific planet. A simpler version of the planet map 10 can include a magnetic coating on the sky plate 11 with a metal sphere substituted for the magnet 9, shown earlier in FIG. 1. In the event the base wall or ceiling is metal, the metal sky plate 11 can be substituted with a felt or plastic plate, since the magnet balls will attach to the metal base wall per se.

Figure 3:
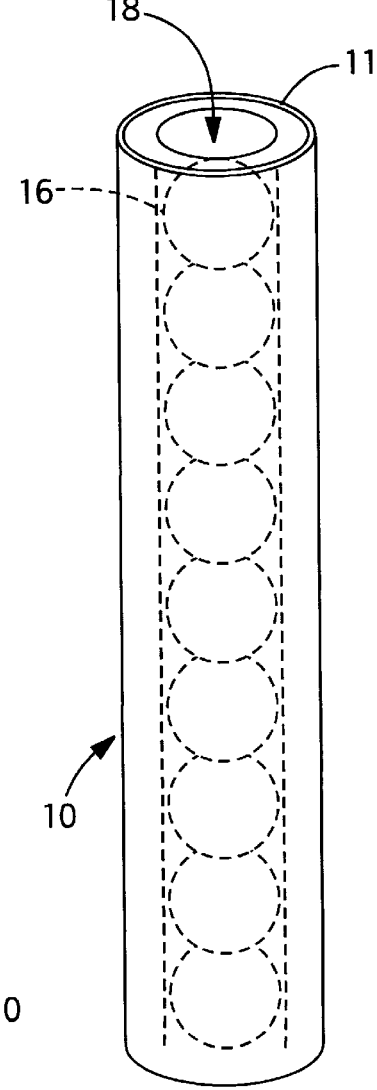
FIG. 3 is a front perspective view of the planet map of FIG. 1 wrapped in a cylindrical configuration.

A separate planet map 10 can be used within each classroom, or a single planet map can be taken from one classroom to another in the manner shown in FIG. 3. The thin ferrous metal sky plate 11 can be wrapped in a cylindrical configuration whereby a cylindrical interior 18 is arranged in clearance relation to the magnet balls 16. In this configuration, the magnetic attraction between the individual magnet balls 16 as well as the magnetic attraction between the magnet balls and the plate prevents the magnet balls from moving out from the cylindrical interior.

A planet map has herein been described that allows real time positioning of a plurality of magnet balls depicting each of the nine planets, without having to disengage the magnet balls from the support plate.

What is claimed is:

1. A teaching aid for planets and the like comprising:
    a metal support plate including a colored sky coating and means for attaching to a ceiling;
    indicia means on a central part of said plate defining a sun; and
    a plurality of balls for positioning around said indicia means, each of said balls is colored a specific color different from any other ball color,
    corresponding to one of a plurality of planets and each of said balls include a magnet therein.

2. The teaching aid of claim 1 wherein said indicia means comprises a colored sun coating.

3. The teaching aid of claim 2 wherein said indicia means comprises a circle of a predetermined diameter.

4. The teaching aid of claim 3 wherein said predetermined diameter is greater than a ball diameter defining each of said balls.

5. The teaching aid of claim 1 wherein said balls comprise felt.

6. The teaching aid of claim 1 wherein said balls comprise plastic.

7. The teaching aid of claim 1 wherein said balls comprise rubber.

* * * * *